United States Patent [19]
Dando et al.

[11] Patent Number: 5,894,127
[45] Date of Patent: Apr. 13, 1999

[54] POLARIZED SPECULAR REFLECTANCE INFRARED APPARATUS AND METHOD

[75] Inventors: Neal R. Dando, Murrysville; William D. Imbrogno, Allison Park, both of Pa.; Theresa S. Knighton, Newburg, Ind.

[73] Assignee: Aluminum Company of America, Pittsburgh, Pa.

[21] Appl. No.: 08/694,605

[22] Filed: Aug. 9, 1996

Related U.S. Application Data

[60] Provisional application No. 60/018,485, May 28, 1996.
[51] Int. Cl.[6] ............................................. G01N 21/55
[52] U.S. Cl. ........................................................ 250/341.3
[58] Field of Search ........................................ 250/341.3

[56] References Cited

U.S. PATENT DOCUMENTS

| | | | |
|---|---|---|---|
| 3,994,586 | 11/1976 | Sharkins et al. | 356/73 |
| 4,015,127 | 3/1977 | Sharkins | 250/341 |
| 4,207,467 | 6/1980 | Doyle | 250/338 |
| 4,853,542 | 8/1989 | Milosevic et al. | 250/353 |
| 5,035,504 | 7/1991 | Milosevic et al. | 356/300 |
| 5,048,970 | 9/1991 | Milosevic et al. | 356/445 |
| 5,088,821 | 2/1992 | Milosevic | 356/319 |
| 5,177,561 | 1/1993 | Milosevic et al. | 356/326 |
| 5,210,418 | 5/1993 | Harric et al. | 250/339 |
| 5,214,418 | 5/1993 | Fukumura et al. | 340/784 |
| 5,220,401 | 6/1993 | Milosevic et al. | 356/246 |
| 5,262,845 | 11/1993 | Milosevic et al. | 356/445 |
| 5,308,983 | 5/1994 | Milosevic et al. | 250/339.01 |
| 5,532,488 | 7/1996 | Ishibashi et al. | 250/341.3 |

OTHER PUBLICATIONS

"Infrared Monitoring of Relubricant on Rolled Aluminum Sheets," *Materials Engineering*, pp. 898–908, Jul. 1990.

Primary Examiner—Constantine Hannaher
Attorney, Agent, or Firm—Douglas G. Glantz; David W. Pearce-Smith

[57] ABSTRACT

A novel fixed block polarized, specular reflective accessory apparatus and method are disclosed, including providing an infrared light generator, a polarizer to polarize infrared light generated by the infrared light generator, a fixed block having an aperture for receiving a sample, a first fixed position mirror on one side of the fixed block wherein the first fixed position mirror is positioned to receive incident infrared light parallel to the plane of reflection at a fixedly set angle, and a second fixed position mirror positioned to receive infrared light reflected from said sample. In one aspect, the fixedly set angle preferably is fixed at about 55°. The novel fixed block polarized, specular reflective accessory apparatus and method provide a high efficiency, high accuracy, high quality and quantitative process control coating measurements for coating operations in manufacturing coated aluminum alloy sheet.

20 Claims, 5 Drawing Sheets

POLARIZED SPECULAR REFLECTANCE INFRARED APPARATUS AND METHOD

CROSS REFERENCE TO RELATED APPLICATIONS

This application claims the benefit of U.S. Provisional application Ser. No. 60/018,485, filed May 28, 1996.

BACKGROUND OF THE INVENTION

The present invention relates to surface coating measuring processes and apparatus. In one aspect, this invention relates to an aluminum alloy sheet surface coating measuring apparatus and method.

Quality coated aluminum alloy metal sheet manufacturing processes require measuring and knowing the amount and depths of surface coatings on the aluminum alloy metal sheet.

Conventionally, rapid and capable measurements of organic coating weight are important for manufacturing coated sheet products, i.e., such as coated aluminum metal or metal alloy sheet products. These measurements are important for aluminum metal or metal alloy sheets which are re-oiled, roll coated, conversion coated, or which have coatings applied by the electro-coating process. Quality measurements are needed for providing coating uniformity measurements in units of mils as well as $mg/ft^2$, $mg/in^2$, or $g/m^2$.

Coating aluminum alloy metal sheet involves a number of different coating materials, each coating designed to meet the needs of a particular aluminum alloy sheet product line. Coatings are applied to aluminum sheet using one of two application techniques, electro-coating (E-Coat®) or roll coating. The application method is dictated by the coating material type or the end product use. In the E-Coat® technique, the same coating is applied to the top and bottom sheet surfaces. Roll coating allows for the same or different coatings to be applied to the two surfaces.

Quality control of the coating material weight today involves several different analytical techniques. The different techniques include near infrared (NIR) spectroscopy, gravimetric strip weight measurements, and strand gauge measurements. All of these process control methods are quantitative analytical techniques aimed at determining the amount of coating applied on aluminum sheet. Weight measurements are made on designated coils of metal on both the top and bottom surfaces and across the entire sheet width at the operator, center, and drive positions.

Strip weight methodology is the primary measuring standard for determining coating weights and has been used commercially for several years. Strand gauge and NIR measuring techniques are secondary methodologies, calibrated with a set of primary strip weight standards for each coating type. Strand gauge methodology also has been used commercially for several years, while NIR is a relatively new technique.

The strip weight methodology is gravimetric based. The method requires determining sample gross weight, stripping off the coating from one of the metal surfaces, and reweighing the stripped sample. The net difference between the two weight measurements (standardized to $mg/in^2$ ($mg/cm^2$) of surface) represents the coating weight for that particular surface (top or bottom) and coil position (operator, center, drive). Because the sample is greater than one square inch (6.5 $cm^2$), the reported coating weight (in $mg/in^2$ ($mg/cm^2$)) represents an average weight over the 7.07 square inches (45.6) (3-inch (7.6 cm) diameter circular disk) sample size.

Depending on the coating type, the strip weight method utilizes one of two techniques that aid in coating removal from the metal substrate, i.e., concentrated sulfuric acid or methyl ethyl ketone (MEK) solvent. Sulfuric acid typically is used to remove water-based coatings. The acid acts by swelling the coating, allowing the coating to be peeled off the metal. MEK is typically used to remove organic-based coatings. The solvent softens the coating by dissolving some of its polymer base. When softened, the coating can be rubbed off the metal with a brush. With both of the techniques, the strip weight method leaves a clean, coating-free metal surface.

The strip weight methodology is time consuming (average of 10 minutes per sample) and involves hazardous operation. The method is destructive in nature and requires punching a three-inch (7.6 cm) diameter circular sample from an appropriately designated coil of coated metal.

Strip weight measurements are hazardous operations from both safety and environmental points of view. Sulfuric acid is a highly corrosive, oxidizing agent that can cause severe burns to the skin or lung tissue, either through direct contact with the acid or with the acid vapors. MEK is a class 1B flammable solvent that is harmful if inhaled, swallowed, or absorbed through the skin. Strip weights should be performed in a properly functioning exhaust hood with the appropriate safety equipment. Both of these stripping agents are also considered hazardous wastes and must be disposed of following established hazardous waste disposal procedures.

The strand gauge methodology for coating weight determinations is a non-destructive secondary quantitative analysis technique. The method provides coating weight measurements as a function of electric current resistance through a coated sample between two probes. One probe is placed on the coating, covering an approximately 0.3 square inch (1.9 $cm^2$) area. The other probe is placed in direct contact with the underlying metal. Coating weight data obtained from this method represents the average weight distributed over the 0.3 square inches (1.9 $cm^2$) contacted by the probe. For each coating type, several calibration curve is constructed that relates measured resistance to weight for each of the standards. This calibration curve then can be used to predict coating weights on samples. A separate calibration curve and standard set are needed for each coating type analyzed by this method.

When strip weight standards have been accumulated, safety and environmental concerns using strand gauge methodology are minimal. This technique is capable of predicting strip weights within minutes and within a ±0.3 $mg/in^2$ tolerance with the strip weight value without actually stripping the sample. However, with heavier coating weights (those above 7 $mg/in^2$ (1.9 $mg/cm^2$)), strand gauge precision and accuracy errors exceed strip weight data by more than the established 0.3 $mg/in^2$ (0.05 $mg/cm^2$) tolerance. Hence, strand gauge methodology is not used to determine the heavier weight coatings.

The NIR (near infrared) spectroscopy measurement methodology is capable of predicting heavy coating weights. Like the strand gauge, NIR methodology is a non-destructive secondary quantitative analysis technique. Analysis time is on the order of only a few minutes per sample, and its mode of operation is based on the response from combination bands of aliphatic C-H stretch absorptions in the near infrared frequency range (2458 manometers). Prediction capability (NIR data vs. strip weight data) is less than 0.2 $mg/in^2$ (0.03 $mg/cm^2$).

Coating weight data obtained from the NIR spectroscopy measurement method represents the average weight distributed over approximately a 1 square inch (6.5 cm$^2$) area. Coating weights are predicted from calibration curves that relate instrument responses to strip weights for each coating type. As with the strand gauge, when step weight standards have been accumulated, safety and environmental concerns are minimal with the NIR methodology.

Since NIR methodology uses normal incidence, this method is less accurate for coating weights on aluminum sheet.

INTRODUCTION TO THE INVENTION

Current coating measurements are either too labor intensive and generate waste (strip-weigh) or are limited to narrow coating weight ranges or types, i.e., such as cured vs. uncured.

While infrared absorbance has been demonstrated capable of providing suitable measures, conventional or commercially available accessories are only able to determine coating weights over limited weight ranges. Outside these limits, artifacts occur such as interference fringes.

It is an object of the present invention to provide a novel polarized, specular reflective accessory apparatus and method.

It is an object of the present invention to provide a novel polarized, specular reflective accessory apparatus and method suitable for use in a manufacturing facility.

It is an object of the present invention to provide a novel polarized, specular reflective accessory apparatus and method suitable for providing high quality process control measurements for coating operations in manufacturing aluminum alloy sheet.

Another object of the present invention is to provide a novel polarized, specular reflective accessory apparatus and method suitable for providing high quality process control measurements for a wide variety of coating operations in manufacturing coated aluminum alloy sheet.

Yet another object of the present invention is to provide a novel polarized, specular reflective accessory apparatus and method suitable for providing high efficiency, high accuracy, high quality process control measurements for a wide variety of coating operations in manufacturing coated aluminum alloy sheet.

These and other objects of the present invention will become apparent from the detailed description which follows.

SUMMARY OF THE INVENTION

The present invention provides a novel fixed block polarized, specular reflective accessory apparatus and method including providing an infrared light generator, a polarizer to polarize infrared light generated by the infrared light generator, a fixed block having an aperture for receiving a sample, a first fixed position mirror on one side of the fixed block, wherein the first fixed position mirror is positioned to receive infrared light parallel to the plane of reflection at a fixedly set angle, and a second fixed position mirror positioned to receive infrared light reflected from said sample. In one aspect, the fixedly set angle is fixed at about 55°.

DETAILED DESCRIPTION

In accordance with the present invention, a novel polarized, specular reflective accessory apparatus and method are provided for use with conventional or commercially available IR (infrared) instruments. In one aspect, this invention relates to a fixed block, fixed angle surface coatings measuring apparatus and method.

The invention includes a polarizer to polarize the incident IR light parallel to the plane of reflection and a specular reflectance accessory wherein the incident IR beam is incident on the sample surface and reflected from the sample surface at a fixed angle of about 53° to 57°, preferably about 54° to 56° from normal, more preferably about 55° from normal. Below 53° and above 57°, interference fringes are observed. The fewest interference fringes occur at the fixed angle of about 55° from normal.

The fixed block, fixed angle surface coatings measuring apparatus provides an integral unit operation useful in the manufacture of coated metal or metal alloy sheet products, i.e., such as for the manufacture of coated aluminum metal or metal alloy sheet products.

The fixed block, fixed angle surface coatings measuring apparatus provides an integral unit operation not available from conventional variable angle accessories available today.

We have found that the particular fixed block, fixed angle surface coatings measuring apparatus of the present invention provides an integral unit operation for the manufacture of coated aluminum metal or metal alloy sheet products.

The infrared (IR) beam of the present invention is directed in the range of about 53° to 57° incidence from sample surface normal. The angle of the present invention provides for artifact-free analyses of the required coatings used at aluminum coating manufacturing at all thicknesses used.

In accordance with the present invention, samples preferably are placed so that the direction of the IR beam is parallel to the rolling direction, although the accessory of the present invention is capable of working without regard to orientation.

The invention can be used for rapid, capable, nondestructive coating weight measurements for roll coatings, coatings applied by the electro-coating process, re-oils, post-lubes, and conversion coatings at the application targets used at aluminum coating manufacturing facilities today.

No conventional or commercially available device is capable of these measures for all organic coating applications. No conventional or commercially available fixed block device is so capable for a unit operation manufacturing process for coated aluminum or aluminum alloy sheet at the required angle of the present invention for these measures for all coated aluminum sheet applications.

Moreover, the invention can be used for compositional analyses on product ID (inside diameter) on either flat or irregularly shaped materials, i.e., cans. The data is free of interference fringes (artifacts) common to conventional devices available commercially.

Figure 1:
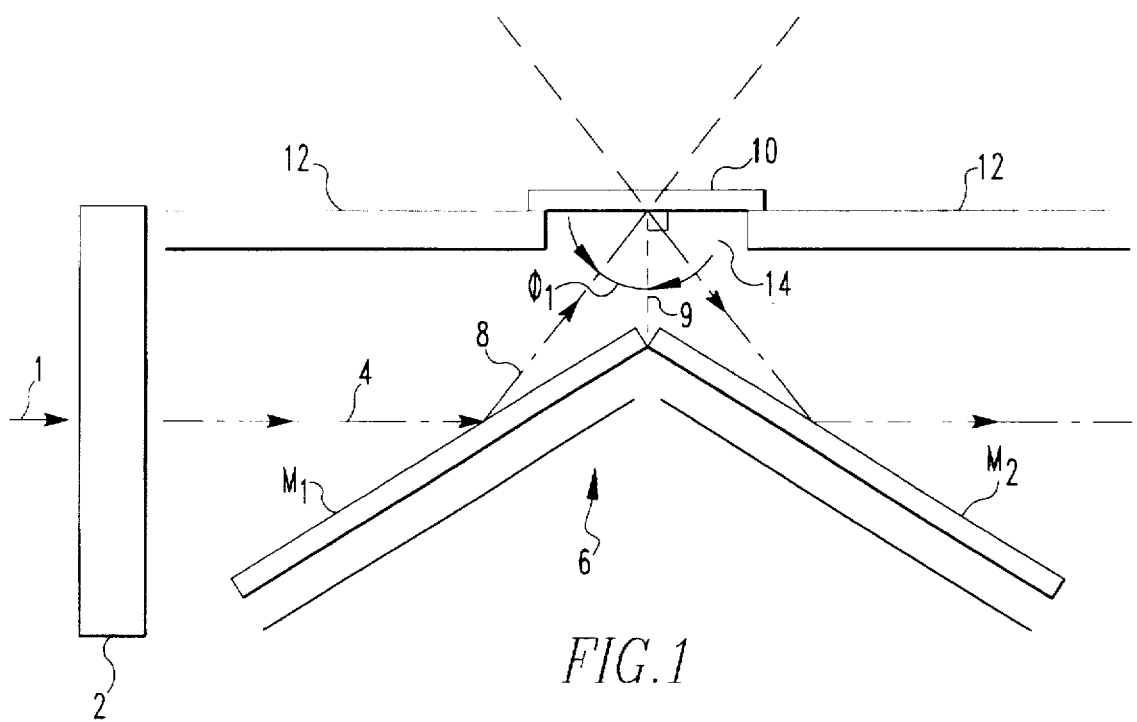
FIG. 1 shows a schematic diagram of the novel polarized, specular reflective accessory mechanism in accordance with the present invention.

Referring now to FIG. 1, light 1 from an infrared generating instrument (not shown) is passed to polarizer 2. Polarizer 2 is oriented so that incident beam 4 is polarized parallel to the plane of reflection as it enters fixed accessory 6. The plane of reflection is defined by the three points of reflection at (1) mirror $M_1$, (2) sample 10, and (3) mirror $M_2$. Polarization is defined with respect to the plane of light travel. In the accessory of the present invention, the plane of light travel over its full course through the accessory is perpendicular to the sample surface, and polarization is parallel to the plane of incidence. Parallel polarized light will not be reflected from the front surface of the coating at 55°. Rather, it will penetrate the coating, hit the metal, and come out again. Interference fringing is caused by light reflected from both the coating surface and the metal surface underneath the coating. When the distance between the coating surface and the underlying metal is on the order of the wavelength of the light, constructive and destructive interference occurs.

Fixed accessory 6 contains front surface mirrors $M_1$ and $M_2$, which are positioned so that the angle of incidence with the sample is set at a fixed angle in the range of about 53° to 57° from surface normal. Light is reflected from $M_1$ along path 8 to sample 10 positioned over fixed block 12 having aperture 14. The angle from normal to the surface of the sample and the light path way directed to the sample is shown as $\phi_1$. Light angle $\phi_1$ is measured from normal incidence to the sample surface, in accordance with optical engineering standards convention. That is, the angle is measured as the difference between incident light beam 8 and normal 9.

Fixed block 12 is provided by a solidly constructed metal block so that the unit can withstand the hostile physical environment of a manufacturing facility.

Variable angle accessories, on the other hand, do not maintain a constant angle in such a hostile physical environment of a manufacturing facility. With each small deviation from the angle, interference fringes are observed.

With the accessory apparatus of the present invention, workers can take the accessory unit out of the instrument, set it down, move it around, spill something on it, clean it, put it back in the instrument, and through all movements and operations, the angle can not change. In this way, the accessory apparatus of the present invention does not need to be fully understood by the technician or manufacturing worker in how it functions internally or how the angle must be set up. In this way, the accessory apparatus of the present invention is robust for process use in a manufacturing facility.

The accessory apparatus of the present invention operates very efficiently because all the worker needs to do is blank out (cut out) a sample and put it on the accessory unit.

With variable angle accessories, on the other hand, the worker must set the mirror properly, make sure the sample is very flat, and the variable mechanism must be operated properly over a range of angles. In a hostile physical environment of a manufacturing facility, each small deviation from the preferred angle creates undesirable interference fringes.

The polarizer may be on the exit end of accessory 6 as well as the entrance end, as shown in FIG. 1. The polarizer thereby can be positioned to polarize the light after it hits the sample as well as before the light hits the sample, as shown in FIG. 1.

Figure 2:
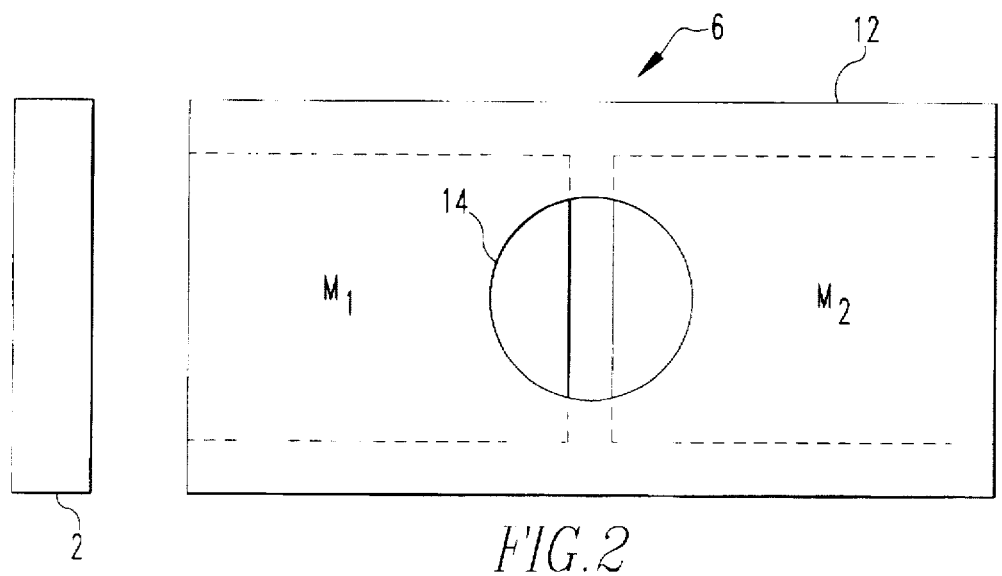
FIG. 2 shows a top view schematic diagram of the novel polarized, specular reflective accessory mechanism in accordance with the present invention.

Referring now to FIG. 2, a top view schematic diagram shows the novel polarized, specular reflective accessory mechanism in accordance with the present invention. Aperture 14 is seen to be a circular cut out in fixed block top 12.

Figure 3:
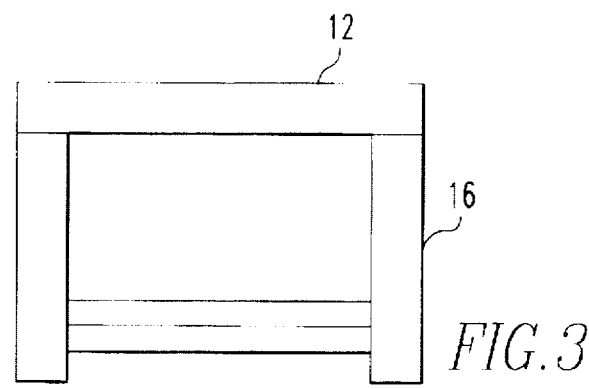
FIG. 3 shows a front view schematic diagram of the novel polarized, specular reflective accessory mechanism in accordance with the present invention.

Referring now to FIG. 3, a front view schematic diagram shows the novel polarized, specular reflective accessory mechanism in accordance with the present invention. A goal post shaped support 16 holds the accessory unit into a fixed block, fixed angle condition.

Figure 4:
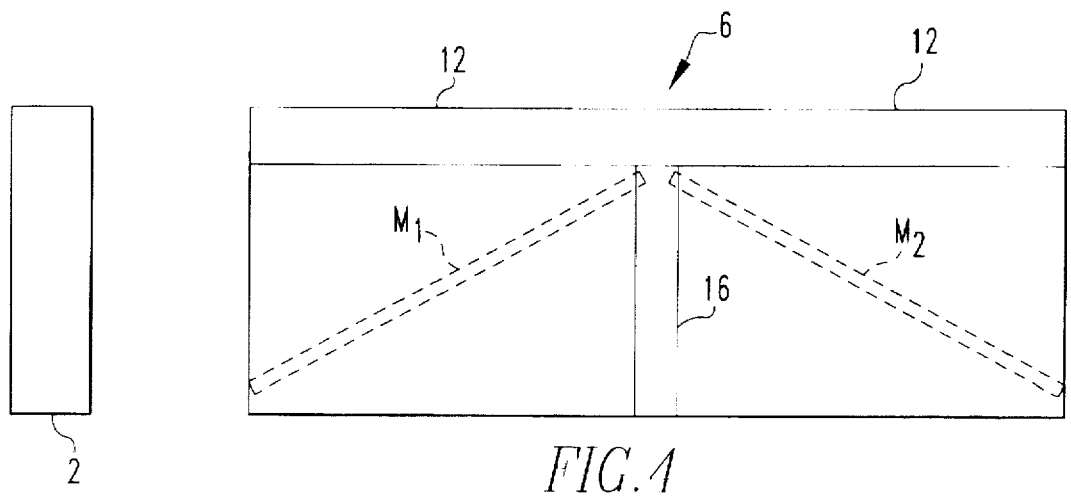
FIG. 4 shows a side view schematic diagram of the novel polarized, specular reflective accessory mechanism in accordance with the present invention.

Referring now to FIG. 4, a side view schematic diagram shows the novel polarized, specular reflective accessory mechanism in accordance with the present invention.

Figure 5:
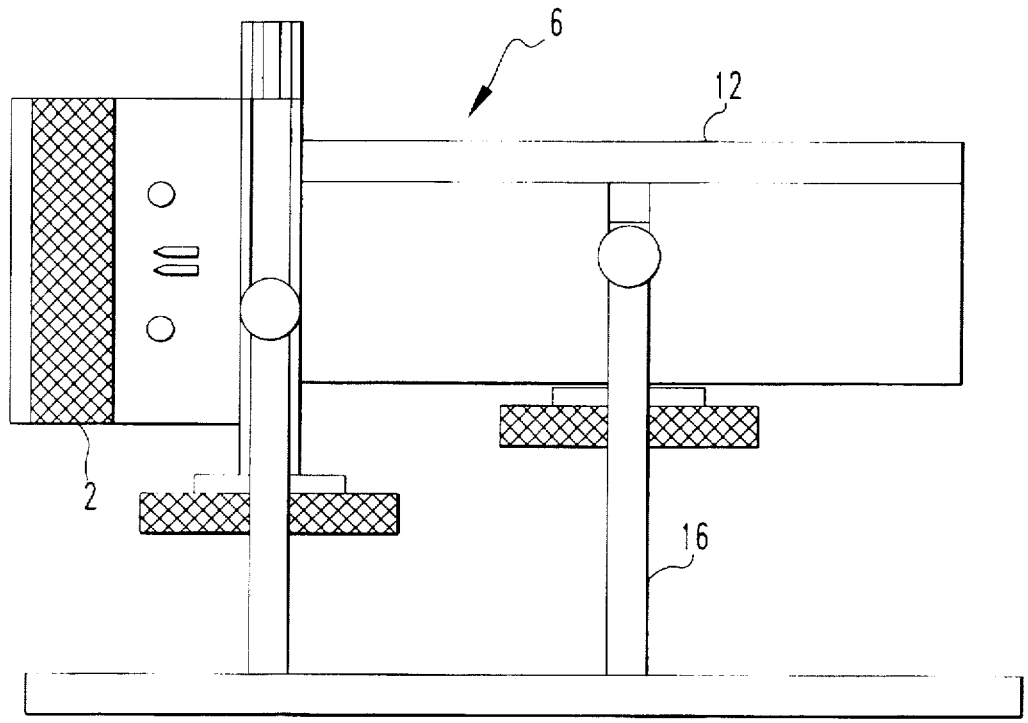
FIG. 5 shows a side elevational view of the novel polarized, specular reflective accessory mechanism in accordance with the present invention.

Referring now to FIG. 5, a side elevational view shows the novel polarized, specular reflective accessory mechanism in accordance with the present invention. The accessory is shown as it would appear without hidden line views as shown in the other figures.

Figure 6:
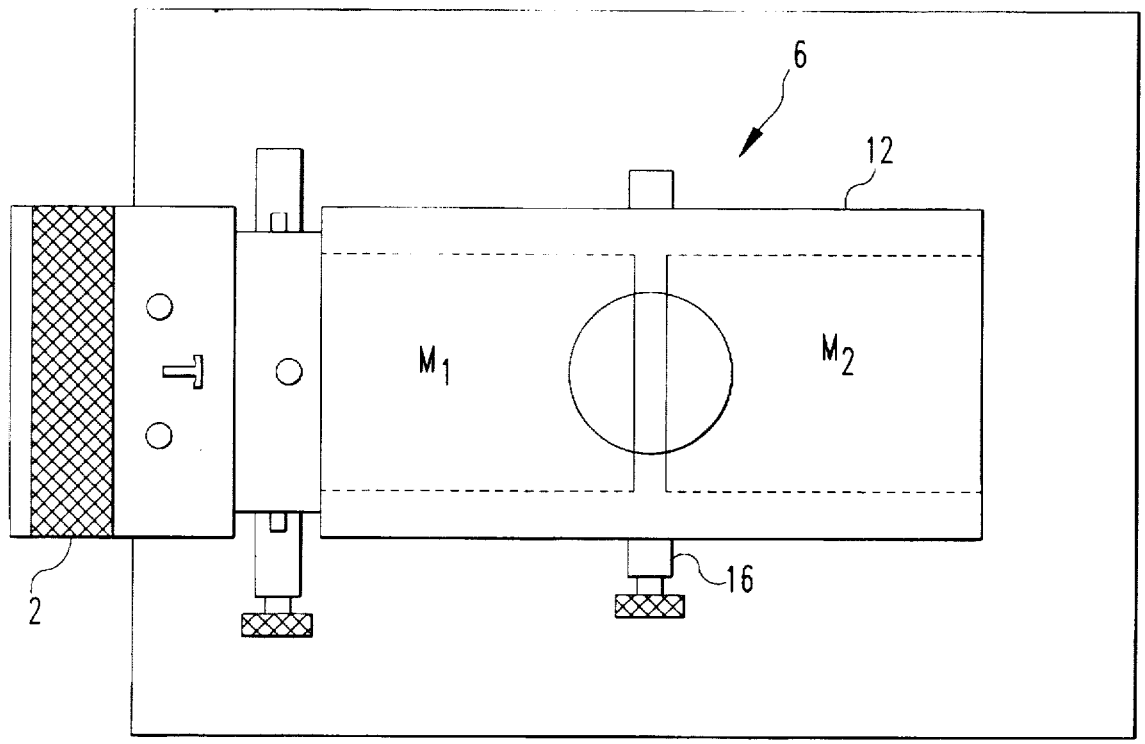
FIG. 6 shows a top view schematic diagram of the novel polarized, specular reflective accessory mechanism in accordance with the present invention.

Referring now to FIG. 6, a top plan view shows the novel polarized, specular reflective accessory mechanism in accordance with the present invention.

Our recent research has resulted in the development of the novel alternative coating weight analysis apparatus and method of the present invention. This methodology utilizes fundamental molecular vibration response modes in the mid infrared frequency range to provide both quantitative and qualitative coating data. The developed method is similar to strand gauge and NIR methodology in that it is a nondestructive secondary quantitative technique for coating weight determinations and takes only about 30–40 seconds analysis time per sample. In addition to coating weight, this methodology also supplies qualitative coating type information (coating identification) from the same, single infrared (IR) analysis. Neither the strand gauge, NIR, or strip weight methods can provide unambiguous qualitative information about the coating being analyzed. The mid infrared method of analysis can predict coating weights to more precise strip weight tolerances as contrasted to those from strand gauge and NIR measurements.

The IR analysis technique provides a qualitative identification tool and a fingerprint of the molecular structure of the analyzed sample based on observed absorbance frequencies from which an unambiguous interpretation of the resins comprising the coating can be made.

The intensity of an absorption band in an infrared spectrum is dependent on the number of molecules contained within a sample that give rise to that particular vibration. Quantitative analysis in any spectroscopic technique (that includes infrared and near infrared spectroscopies) is governed by the following equation:

$$A = abc$$

where,
- A=instrument response
- a=absorptivity of the analyzed material
- b=pathlength
- c=concentration.

In the quantitative coatings analysis methodology of the present invention, standards and samples can have the same absorptivity and concentration, so that pathlength, or coating thickness, can be the variable directly affecting the magnitude of the observed absorbance response.

Conventional infrared analyses of coatings on metal substrates use a reflectance mode of analysis resulting in the appearance of interference fringes (or channel spectra) superimposed within the sample spectrum. The number and frequency of fringes are dependent on sample thickness, sample refractive index, and contact incident angle with the sample. Interference fringes are sinusoidal in nature and arise from constructive and destructive interferences of internally reflected radiation inside the sample. These fringes usually have an amplitude of two times the internal reflectivity (2R, where R=reflectivity) of the sample. While interference fringes do not affect the observed peak absorbance position in an infrared specimen, peak intensity can be dramatically affected.

Nondestructive elimination of spectral fringes in infrared analyses has been documented. Use of parallel polarized incident radiation at Brewster's angle removes fringes from a sample spectrum. Brewster's angle is defined as the angle of incident radiation where the internal reflectivity of the sample (R) equals zero. The actual incident angle at which the Brewster's angle effect is observed depends on the refractive index of the sample as well as the orientation (polarization) of the incident radiation making contact with the sample.

Empirical investigations into quantitative coating analysis by FTIR spectroscopy determined the fixed angle of the apparatus and method of the present invention.

EXAMPLE 1

Samples of coated metal were analyzed on a Digilab FTS model 15/90 FTIR spectrometer with a nitrogen cooled mercury cadmium telluride (MCT) detector connected to a 3240 data station. The spectrometer system was subjected to a constant 70 cubic feet per hour nitrogen gas purge flow to ensure a dry, $CO_2$-free internal environment. A Harrick Scientific Corporation variable angle Retro-Mirror Accessory (RMA) with a Versatile Reflection Attachment (VRA) was used as the sampling accessory. A variable angle wire grid KRS-5 polarizer allowed for direct manipulation of the incident light polarization.

Infrared spectra, from a sample of coated aluminum metal, were obtained at several different angle settings (at 2.5° intervals) on the RMA-VRA sampling accessory to establish Brewster's angle. Spectra acquired at Brewster's angle are theoretically void of interference fringes. With parallel polarized light, an incident angle of 55° provided for a fringe-free infrared spectrum.

Slight deviations from this angle resulted in dramatic increases in spectral fringing. Spectra from analyses of other coating types with the same accessory attachment settings also exhibited spectra free of interference fringes suggest that the refractive indices of these coatings are similar to each other.

EXAMPLE 2

When the interference phenomenon associated with external reflectance analysis (ERA) spectroscopy was addressed, the feasibility of using FTIR spectroscopy as a quantitative analysis tool for determining coating weights was evaluated. Strip weight standards with coating weights ranged from 1.1 to 11.9 mg/in$^2$ (0.2 to 1.8 mg/cm$^2$) were analyzed with the equipment and sampling accessory previously described. Spectral data was obtained from the co-addition of 16 scans at a resolution of 4 cm$^{-1}$, using the integrated area response from the C-H stretching vibration to represent the amount of coating on each standard. A 1 term, straight line, linear least squares regression model was used to relate instrument response to coating weight.

Regression analysis indicated a correlation coefficient of 0.9953 with a 1s calibration error of 0.4 mg/in$^2$ (0.06 mg/cm$^2$) was observed over the entire standard weight range.

Results from this preliminary quantitative coating weight study show that the technique is capable of providing coating weights from coated samples with an accuracy exceeding NIR and strand gauge methodologies.

Sample loading with the Harrick RMA-VRA accessory is cumbersome and time consuming. The sample is side-mounted onto the accessory with the roll grain direction parallel to the radiation path. Two Teflon screws manually tighten and hold the sample in place, taking upwards of 2 minutes per sample to complete. Though not a time constraint for a single sample, cumulative sample loading time may become an analysis rate limiting factor.

Previous work with prelube tab analyses used a commercially available refractor accessory as the sampling vehicle. This accessory, as supplied from Harrick, uses a simple sample loading step that takes only a few seconds of an analyst's time. The sample is merely positioned with the roll grain parallel to the radiation path, coated side down, on top of the accessory. The standard issue commercially available refractor is an ERA accessory that permits parallel polarized radiation to contact a sample but at grazing angle incidence. Use of this accessory for coating weight analyses would result in spectral fringing.

Through a modification of the commercially available refractor design, coating analyses without fringing is possible. The commercially available refractor incident angle was modified to permit sample contact at 55° while still maintaining the same simplistic sample loading concept. An incident angle of 55° was used based on results from work previously performed that established incident angle for the samples. The accessory apparatus of the present invention analyzes an area of approximately 0.4 square inches (2.6 cm$^2$).

The original commercially available refractor design has two zinc selenide (ZnSe) wedged window crystals on either side of the sample that serve to reflect the IR beam to the Si polarizer, permitting plane polarized radiation to contact the sample. The apparatus of the present invention eliminates the ZnSe crystals. Light polarization is maintained in the accessory apparatus of the present invention by using a separate germanium polarizer mounted in concert with the refractor accessory.

EXAMPLE 3

Coating weight determinations for several different coating types were evaluated using the FTIR/accessory apparatus of the present invention. These evaluations were based on linear regression based calibration curves that correlated coating weights (as reported from strip weight analysis) to instrument response at an appropriate IR absorbance frequency. Both straight line and second order polynominal models were used, depending on the coating type. The coatings evaluated included six coatings typically used at the Aluminum Company of America Warrick Operations and one from Aluminum Company of America Swansea Works. In addition, a flexible packaging insulation coating from Aluminum Company of America Lebanon Works also was evaluated. Samples were aligned on the accessory apparatus of the present invention with the roll grain parallel to the direction of radiation. Spectrometer analysis conditions were the same as those described in the feasibility stage of this report.

Strip weight values on these coatings had been previously determined. The number of standards used for each coating type varied, ranging from a minimum of 8 up to as many as 11. Different statistical models and absorbance frequency responses were investigated. In all cases, correlation coefficients of 0.97 or greater were obtained along with corresponding 1s calibration errors of 0.4 mg/in$^2$ (0.06 mg/cm$^2$) or less. Distribution of the residual error values from each of the coating types were random.

Coating identifications for qualitative analysis purposes can be made from the same FTIR measure used to determine coating weight. Considering the entire IR spectrum as a whole, the fingerprint spectral absorbance pattern is unique to each of the analyzed coatings. Irrespective of the coating weight, the same qualitative IR spectrum will be obtained for a given coating type. Reference fingerprint spectra for the eight analyzed coating types were observed and evaluated. Qualitative coating identification were made by comparing absorbance frequencies and peak intensity ratios from these reference spectra with those obtained from production samples of coated metal.

Even though each coating is unique in composition, all of the coating types investigated are comprised of relatively similar resins and exhibit similar refractive indices. Coating thickness (coating weights) are also within the same range.

The accessory apparatus of the present invention provided virtually fringe free spectra. Even with fringing (observed in some pigmented coatings), changing the response frequency that represents coating concentration to an area in the IR spectrum with minimal fringing, resulted in a correlation coefficient of 0.9906, which is similar to those from the other coatings.

Figure 7:
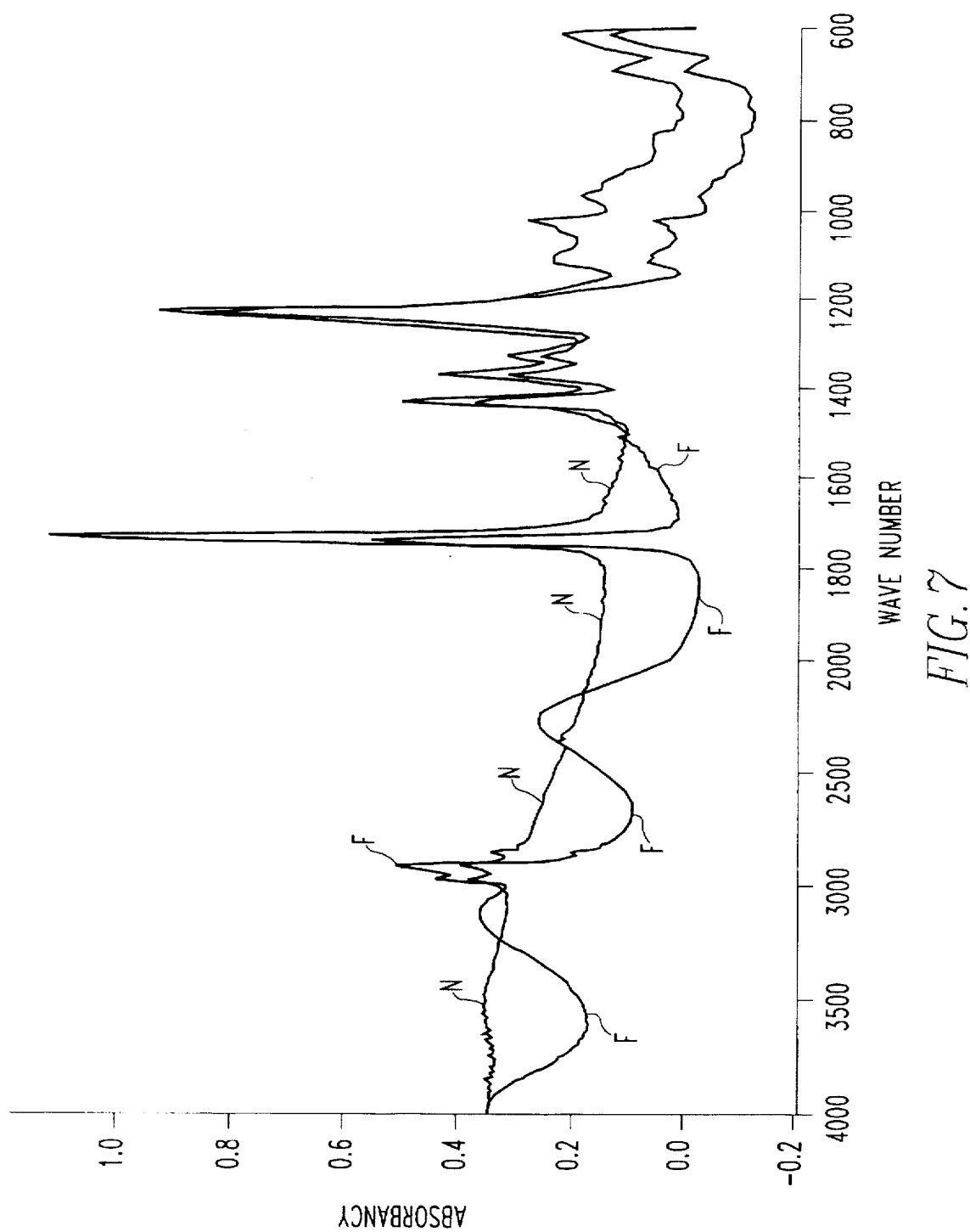
FIG. 7 shows a graphical depiction of spectra associated with the novel polarized, specular reflective accessory mechanism of the present invention.

Referring now to FIG. 7, a graphical depiction shows spectra associated with the novel polarized, specular reflective accessory mechanism of the present invention. Fringes are apparent from the curve identified as F which is associated with no polarization, contact angle not at 55°. No fringes are apparent from the curve identified as N which is associated with plane polarized radiation, contact angle of 55°.

Figure 8:
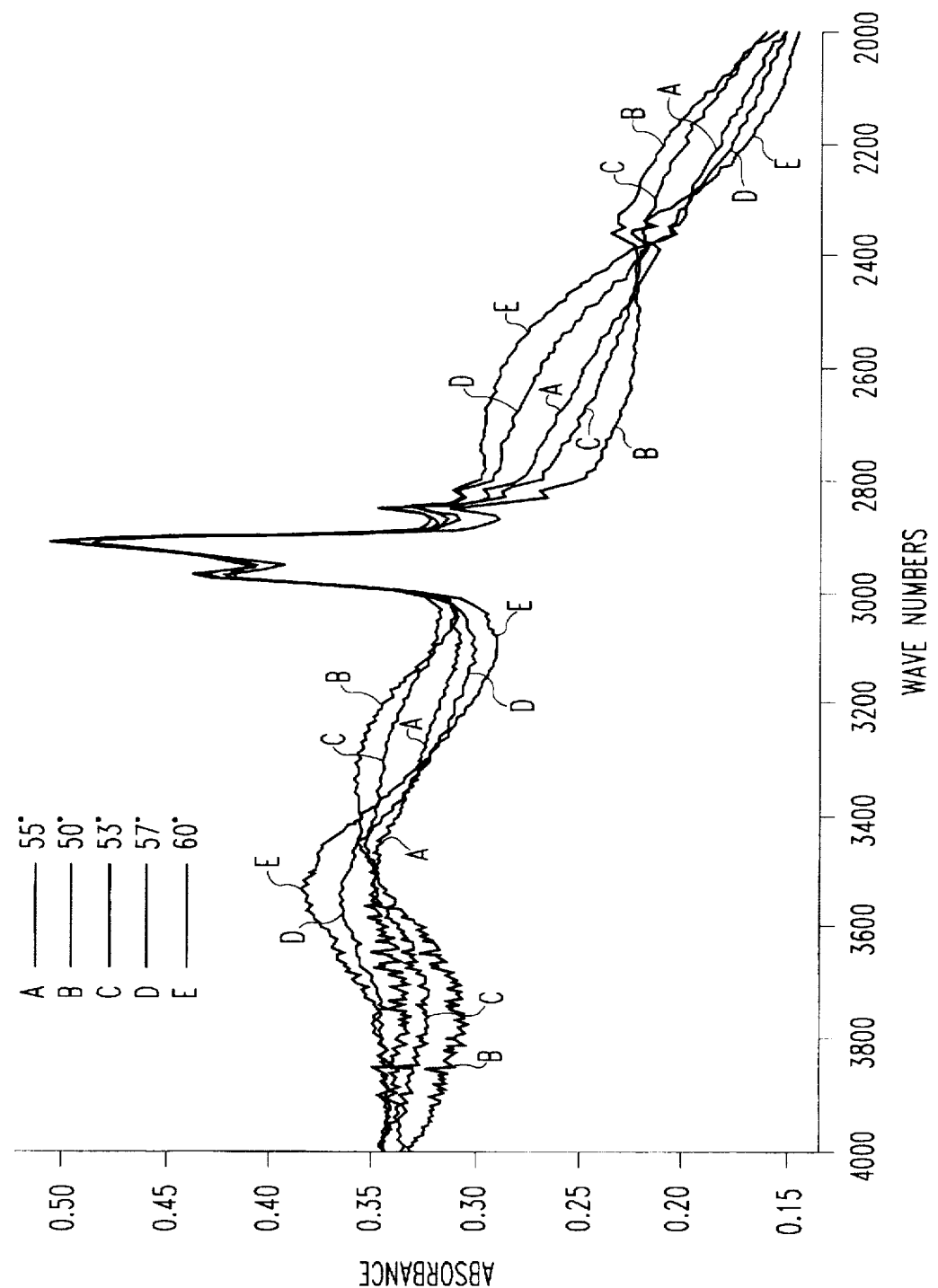
FIG. 8 shows a graphical depiction of spectra associated with the novel polarized, specular reflective accessory mechanism of the present invention.

Referring now to FIG. 8 a graphical depiction shows spectra associated with the novel polarized, specular reflective accessory mechanism of the present invention. The novel polarized, specular reflective accessory mechanism of the present invention provides the curve identified as A which is associated with an angle of 55° for aluminum organic. The spectra curves identified as B, C, D, and E are associated with angles of 50°, 53°, 57°, and 60°, respectively. The fewest interference fringes occur at the fixed angle of about 55° from normal. With even only two degrees from the angle of 55°, e.g., with curves C or D, baseline changes begin to occur. Below 53° and above 57°, significant undesirable interference fringes are observed. The least interference fringing occurs at 55°.

The accessory apparatus and method of the present invention has been observed to work particularly efficiently with measuring reoils (lubricants on metal), coating weights (roll coating on metal), and post-lube weights. The accessory apparatus and method of the present invention has been observed to work with thick and thin coatings without having to change the unit operation.

The accessory apparatus and method of the present invention has been observed to work with application coating weights ranging from mg/ft$^2$ to mg/in$^2$ (mg/in$^2$ to mg/cm$^2$), coating thicknesses varying by a factor of 200, and interference free data across such a wide range of coating thicknesses.

The accessory apparatus and method of the present invention further has been observed to work particularly efficiently with measuring internal lubricants. Aluminum coatings are formulated to include internal lubricant in them. The internal lubricant comes to the surface and can be analyzed by the accessory apparatus and method of the present invention. Moreover, other lubricants can be applied on top of the internal lubricant which has moved to the surface of the coating. The accessory apparatus and method of the present invention provides a determination of how much internal lubricant is present in the coating and how much has migrated to the coating surface.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

What is claimed is:

1. A fixed block polarized, specular reflective accessory apparatus comprising:
    (a) an infrared light generator;
    (b) a polarizer to polarize infrared light generated by said infrared light generator;
    (c) a fixed block having an aperture for receiving a sample; and
    (d) a first fixed position mirror on one side of said fixed block, wherein said first fixed position mirror is positioned to receive incident infrared light polarized parallel to the plane of reflection and further wherein said first fixed position mirror is positioned so that the angle of incidence of said light with the sample surface is established at a fixedly set angle in the range of about 53 degrees to 57 degrees; and
    (e) a second fixed position mirror positioned to receive infrared light reflected from said sample.

2. The fixed block polarized, specular reflective accessory apparatus as set forth in claim 1, wherein said fixedly set angle is fixed at about 55°.

3. The fixed block polarized, specular reflective accessory apparatus as set forth in claim 1, wherein said polarizer is set to polarize said infrared light at a single fixed polarization direction.

4. The fixed block polarized, specular reflective accessory apparatus as set forth in claim 3 wherein said fixedly set angle is fixed at an angle in the range of about 54° to 56°.

5. The fixed block polarized, specular reflective accessory apparatus as set forth in claim 1 wherein the plane of light travel is horizontal.

6. The fixed block polarized, specular reflective accessory apparatus as set forth in claim 1 wherein said fixed block aperture is positioned on the top of the accessory.

7. The fixed block polarized, specular reflective accessory as set forth in claim 1 wherein said polarizer is positioned to polarize the infrared light before contacting said first mirror.

8. The fixed block polarized, specular reflective accessory as set forth in claim 1 wherein said polarizer is positioned to polarize the infrared light after contacting said second mirror.

9. The fixed block polarized, specular reflective accessory apparatus as set forth in claim 1 further comprising a detector for observing and analyzing light received from said second mirror.

10. A process for determining coating thickness for an organic coating on aluminum, comprising:

(a) generating infrared light in an infrared light generator;

(b) polarizing said infrared light generated by said infrared light generator;

(c) placing a sample on a fixed block having an aperture for receiving said sample;

(d) passing said infrared light to a first fixed position mirror on one side of said fixed block, wherein said first fixed position mirror is positioned to receive incident infrared light polarized parallel to the plane of reflection at a fixedly set angle and further wherein said first fixed position mirror is positioned so that the angle of incidence of said light with the sample surface is established at a fixedly set angle in the range of about 53 degrees to 57 degrees; and (e) passing said infrared light to a second fixed position mirror positioned to receive infrared light reflected from said sample.

11. A process for determining coating thickness for an organic coating on aluminum as set forth in claim 10, further comprising holding said fixedly set angle at about 55 degrees.

12. A process for determining coating thickness for an organic coating on aluminum as set forth in claim 10, wherein said polarizing comprises polarizing said infrared light at a single fixed polarization direction.

13. A process for determining coating thickness for an organic coating on aluminum as set forth in claim 12, further comprising holding said fixedly set angle at about in the range of about 54 degrees to 56 degrees.

14. A process for determining coating thickness for an organic coating on aluminum as set forth in claim 10, further comprising passing said infrared light in a horizontal plane of light travel.

15. A process for determining coating thickness for an organic coating on aluminum as set forth in claim 10, further comprising positioning said fixed block aperture on the top of the accessory.

16. A process for determining coating thickness for an organic coating on aluminum as set forth in claim 10, wherein said polarizing comprises polarizing said infrared light before contacting said first mirror.

17. A process for determining coating thickness for an organic coating on aluminum as set forth in claim 10, wherein said polarizing comprises polarizing said infrared light after contacting said second mirror.

18. A process for determining coating thickness for an organic coating on aluminum as set forth in claim 10, further comprising observing and analyzing light received from said second mirror.

19. A process for determining coating thickness for an organic coating on aluminum as set forth in claim 10, further comprising determining internal lubricant coating weights.

20. A fixed block polarized, specular reflective accessory apparatus, comprising:

(a) an infrared light generator;

(b) a polarizer to polarize infrared light generated by said infrared light generator at a single fixed polarization direction;

(c) a fixed block having an aperture positioned on the top of the accessory for receiving a sample; and (d) a first fixed position mirror on one side of said fixed block, wherein said first fixed position mirror is positioned to receive incident infrared light wherein the direction of light travel is horizontal and said single fixed polarization direction is parallel to the plane of reflection so that the angle of incidence of said light with the sample surface is established at about 55 degrees;

(e) a second fixed position mirror positioned to receive infrared light reflected from said sample; and (f) a detector for observing and analyzing light received from said second mirror.

* * * * *